United States Patent
Chan

(10) Patent No.: US 7,736,568 B2
(45) Date of Patent: Jun. 15, 2010

(54) SYSTEMS AND METHODS OF INCORPORATING PREFORMED ITEMS INTO A MOLDED ARTICLE

(75) Inventor: Rick Chan, New Territories (HK)

(73) Assignee: Mattel, Inc., El Segundo, CA (US)

( * ) Notice: Subject to any disclaimer, the term of this patent is extended or adjusted under 35 U.S.C. 154(b) by 105 days.

(21) Appl. No.: 11/857,343

(22) Filed: Sep. 18, 2007

(65) Prior Publication Data

US 2008/0079195 A1 Apr. 3, 2008

Related U.S. Application Data

(60) Provisional application No. 60/846,007, filed on Sep. 19, 2006.

(51) Int. Cl.
*B29C 45/14* (2006.01)
(52) U.S. Cl. ............... 264/275; 264/279; 264/302; 264/310; 264/328.2; 264/334
(58) Field of Classification Search ............ 264/271.1, 264/275, 279, 302, 310, 328.2, 334
See application file for complete search history.

(56) References Cited

U.S. PATENT DOCUMENTS

| | | | |
|---|---|---|---|
| 2,465,276 | A | 3/1949 | Ryder |
| 2,763,031 | A | 9/1956 | Rekettye |
| 3,270,101 | A | 8/1966 | Jardine et al. |
| 3,390,482 | A | 7/1968 | Holtvoigt |
| 3,456,046 | A * | 7/1969 | Rosen .............. 264/45.5 |
| 3,561,060 | A | 2/1971 | Stephens |
| RE28,068 | E | 7/1974 | Lemelson |
| 3,972,975 | A | 8/1976 | Noda |
| 4,028,845 | A | 6/1977 | Licitis |
| 4,038,775 | A | 8/1977 | Sato |

(Continued)

FOREIGN PATENT DOCUMENTS

EP 0256818 2/1988

(Continued)

OTHER PUBLICATIONS

European Patent Office; European Search Report received in corresponding European Application No. 07814939.0 dated Oct. 11, 2009.

*Primary Examiner*—Joseph S Del Sole
*Assistant Examiner*—James Sanders
(74) *Attorney, Agent, or Firm*—Kolisch Hartwell, P.C.

(57) ABSTRACT

A method of forming a molded toy product is disclosed. In some embodiments, the method may include securing a preformed item having a first magnetic-attraction element in a desired location in a mold via magnetic attraction between the first magnetic-attraction element and the mold; adding moldable material into the mold such that the moldable material covers at least part of the preformed item; and curing the moldable material. A mold for manufacturing a molded toy product also is disclosed. In some embodiments, the mold may include a mold core including a surface and at least a second magnetic-attraction element complementary with at least a first magnetic-attraction element of a preformed item; and at least one mold cavity wall spaced from the mold core, wherein an area between the mold core surface and the at least one mold cavity wall is configured to receive moldable material.

11 Claims, 3 Drawing Sheets

U.S. PATENT DOCUMENTS

| | | | |
|---|---|---|---|
| 4,057,612 | A | 11/1977 | Clark et al. |
| 4,183,173 | A | 1/1980 | Ogawa |
| 4,444,550 | A | 4/1984 | Loubier |
| 4,571,209 | A | 2/1986 | Manning et al. |
| 4,596,683 | A | 6/1986 | Powell |
| 4,642,209 | A | 2/1987 | Powell |
| 4,662,857 | A | 5/1987 | Quinn et al. |
| 4,673,374 | A | 6/1987 | Kelley |
| 4,696,653 | A | 9/1987 | McKeefery |
| 4,890,356 | A | 1/1990 | Czech et al. |
| 4,973,234 | A | 11/1990 | Swenson |
| 5,164,144 | A | 11/1992 | Rose |
| 5,257,873 | A | 11/1993 | Abbat |
| 5,281,180 | A | 1/1994 | Lam et al. |
| 5,458,524 | A | 10/1995 | Lucas |
| 5,498,388 | A | 3/1996 | Kodai et al. |
| 5,510,074 | A | 4/1996 | Rose |
| 5,570,124 | A | 10/1996 | Ohno et al. |
| 5,645,780 | A | 7/1997 | Rinehart |
| 5,695,381 | A | 12/1997 | Truchsess |
| 5,858,262 | A | 1/1999 | Lebensfeld |
| 5,894,006 | A | 4/1999 | Herbst |
| 5,913,708 | A | 6/1999 | Gross |
| 5,919,324 | A | 7/1999 | Moffitt et al. |
| 5,955,021 | A | 9/1999 | Tiffany, III |
| 5,989,658 | A | 11/1999 | Miura et al. |
| 6,050,875 | A | 4/2000 | Lee |
| 6,077,083 | A | 6/2000 | Smith-Whitley et al. |
| 6,089,950 | A | 7/2000 | Lee et al. |
| 6,331,028 | B1 | 12/2001 | O'Neill et al. |
| 6,375,778 | B1 | 4/2002 | Cremades Schulz et al. |
| 6,482,287 | B1 | 11/2002 | De Gaulle |
| 6,544,094 | B1 | 4/2003 | Maddocks et al. |
| 6,544,634 | B1 | 4/2003 | Abrams et al. |
| 6,776,681 | B2 | 8/2004 | Willett |
| 7,037,455 | B2 | 5/2006 | Marine |
| 2003/0155262 | A1 | 8/2003 | Graham |
| 2004/0266315 | A1 | 12/2004 | Ejima et al. |
| 2006/0003667 | A1 | 1/2006 | Aisenbrey |

FOREIGN PATENT DOCUMENTS

| | | |
|---|---|---|
| EP | 0936045 | 8/1999 |
| EP | 1342493 | 9/2003 |
| EP | 1666112 | 6/2006 |
| GB | 1388420 | 3/1975 |
| GB | 1423154 | 1/1976 |

* cited by examiner

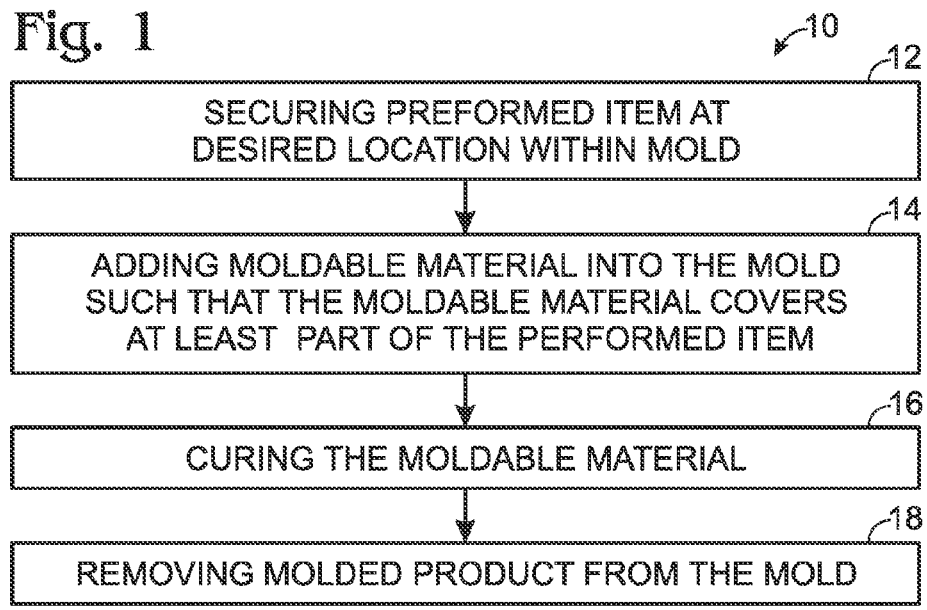
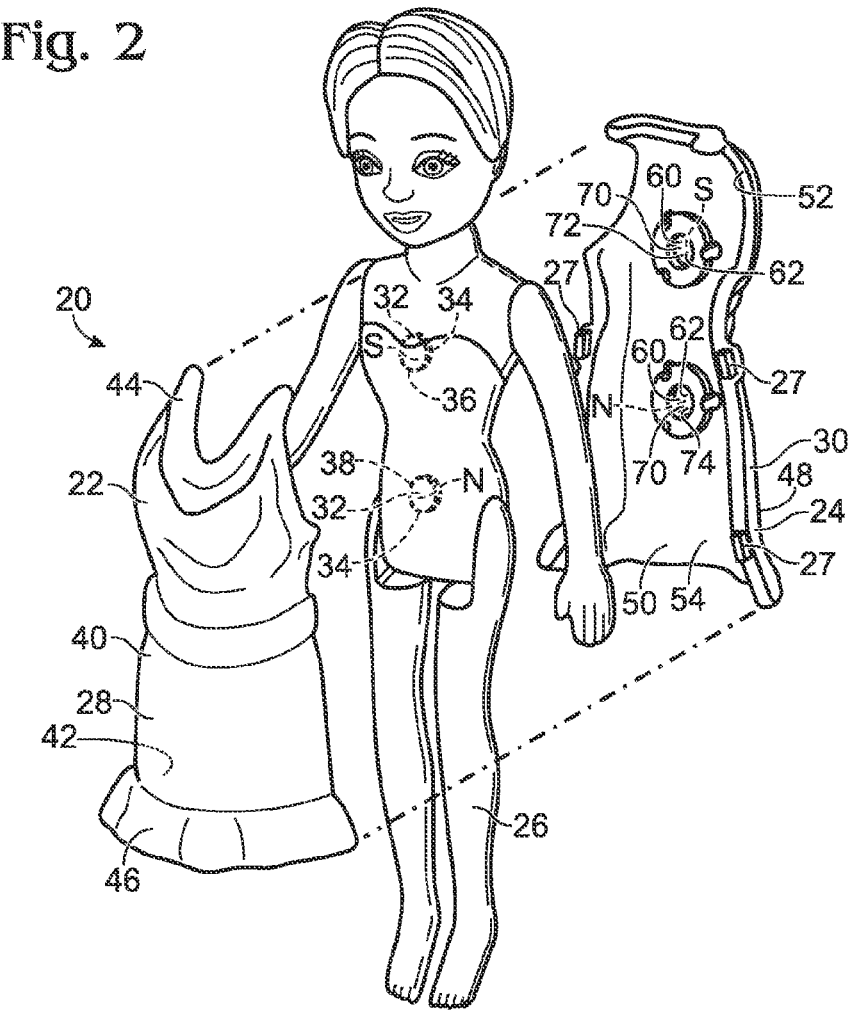

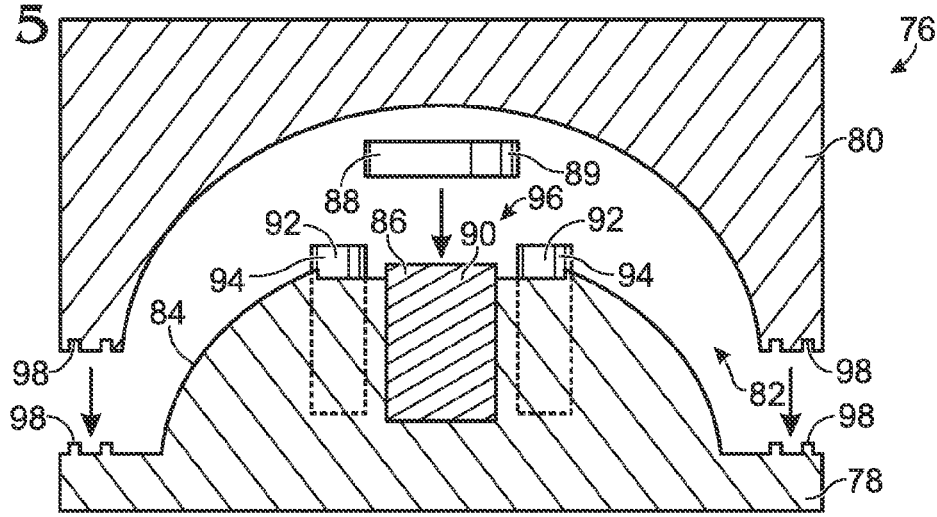
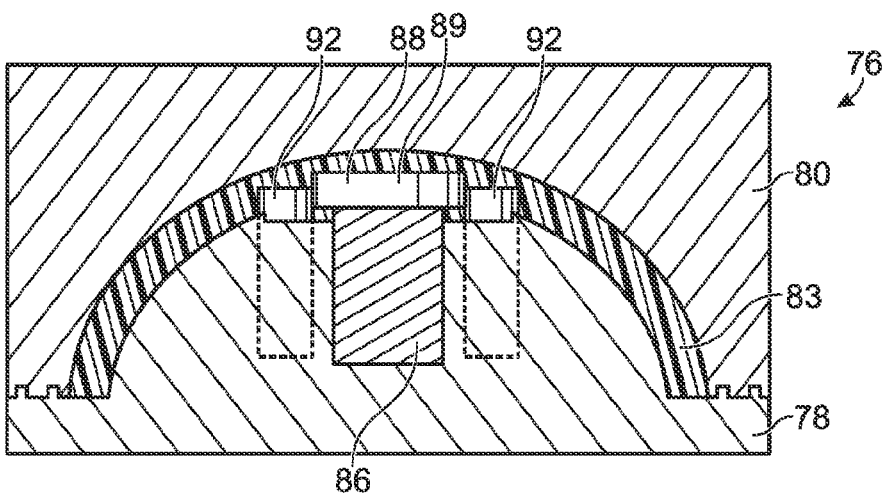
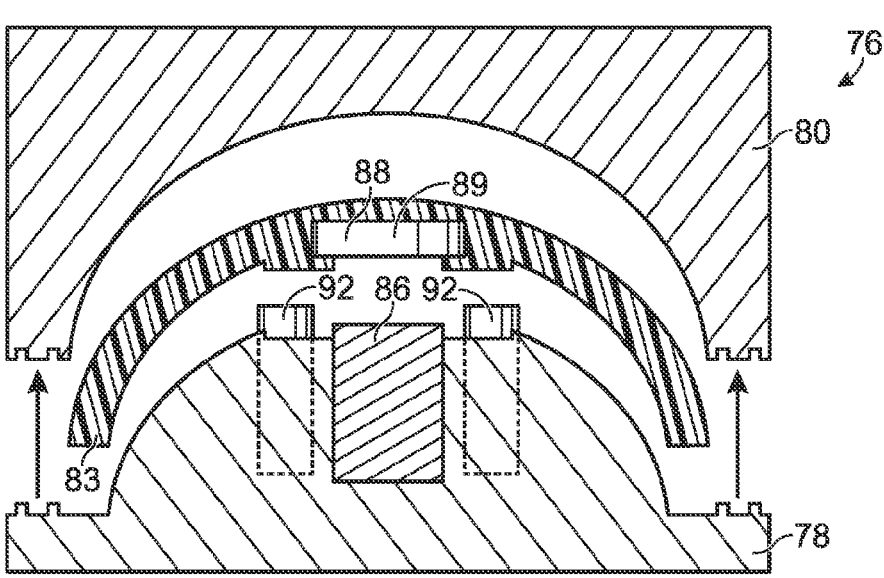

SYSTEMS AND METHODS OF INCORPORATING PREFORMED ITEMS INTO A MOLDED ARTICLE

CROSS-REFERENCE TO RELATED APPLICATIONS

This application claims priority under 35 U.S.C. §119(e) to U.S. Provisional Patent Application Ser. No. 60/846,007 entitled "Methods of Incorporating Preformed Items into a Molded Article," filed Sep. 19, 2006. The complete disclosure of the above application is herein incorporated by reference for all purposes.

BACKGROUND OF THE DISCLOSURE

In the formation of molded articles, the integration of one or more preformed items into the molded article during the molding process may be desired. One common way of incorporating preformed items into a molded article is via insert molding. Insert molding involves first placing the preformed item into a desired location within a mold, and then adding a moldable material, such as a polymer, into the mold in such a manner that the polymer either contacts or surrounds at least part of the preformed item. As the moldable material sets, the preformed item is incorporated into the molded article.

The preformed item typically must be held in place during the molding process. One approach to hold the preformed item in place involves forming mounting holes in the mold that are configured to accept complementary mounting pins on the preformed item. Another approach is to apply adhesive to the preformed item and/or to the mold at the desired location. The latter approach is further described in U.S. Pat. No. 7,037,455, the complete disclosure of which is herein incorporated by reference for all purposes.

Other examples of molding methods and articles manufactured using molding methods are disclosed in U.S. Pat. Nos. 3,270,101; 3,390,482; 3,972,975; 4,028,845; 4,057,612; 4,444,550; 4,571,209; 4,596,683; 4,642,209; 4,662,857; 4,673,374; 4,890,356; 5,164,144; 5,257,873; 5,498,388; 5,510,074; 5,645,780; 5,894,006; 5,913,708; 5,919,324; 5,955,021; 5,989,658; 6,050,875; 6,089,950; 6,331,028; 6,375,778; 6,482,287; 6,544,094; 6,544,634; and 6,776,681; Great Britain Patent No. 1423154; U.S. Patent Application Publication No. 2003/0155262; and European Patent Application No. 0256818. The complete disclosures of the above patents and patent applications are herein incorporated by reference for all purposes.

SUMMARY OF THE DISCLOSURE

Some embodiments provide a method of forming a molded toy product. In some embodiments, the method may include securing a preformed item having a first magnetic-attraction element in a desired location in a mold via magnetic attraction between the first magnetic-attraction element and the mold; adding moldable material into the mold such that the moldable material covers at least part of the preformed item; and curing the moldable material.

In some embodiments, the method may include securing a preformed item having a first magnetic-attraction element to a surface of a mold core via magnetic attraction between the first magnetic-attraction element and the mold core surface, the mold core surface including a second magnetic-attraction element extending from the surface and complementary with the first magnetic-attraction element to provide the magnetic attraction between the first and second magnetic-attraction elements; adding the moldable material into the mold such that the moldable material covers at least part of the preformed item; and curing the moldable material Some embodiments provide a mold for manufacturing a molded toy product. In some embodiments, the mold may include a mold core including a surface and at least a second magnetic-attraction element complementary with at least a first magnetic-attraction element of a preformed item to provide magnetic attraction between the first and second magnetic-attraction elements; and at least one mold cavity wall spaced from the mold core, wherein an area between the mold core surface and the at least one mold cavity wall is configured to receive moldable material.

BRIEF DESCRIPTION OF THE DRAWINGS

FIG. 1 is a flow diagram of some embodiments of a method of incorporating preformed items into a molded article.

FIG. 2 is an isometric view of a toy doll with first and second portions of a molded toy clothing item formed according to the method of FIG. 1.

FIGS. 5-7 illustrate incorporating a preformed item into a molded article according to the method of FIG. 1.

DETAILED DESCRIPTION OF THE DISCLOSURE

FIG. 1 shows, generally at 10, an embodiment of a method of incorporating one or more preformed items into one or more molded articles. Method 10 may include first securing a preformed item at a desired or selected location within the mold. In some embodiments, the preformed item may be secured at the desired location via one or more magnetic-attraction elements and/or one or more guides. Next, method 10 may include adding a moldable material into the mold such that the moldable material covers at least part of the preformed item. After the moldable material is added into the mold, the moldable material may then be cured to form the molded article and to secure the preformed item within the molded article. After curing, the molded article with the preformed item may be removed from the mold.

A wide variety of preformed items may be insert molded via method 10, for example, either flexible or rigid preformed items. Examples of suitable preformed items include magnets, plastic sheets, pieces of fabric, plastic parts, metal parts, printed circuit boards, and/or other electrical components. Likewise, method 10 may be used to manufacture a wide variety of molded articles, including toy items such as doll clothing items (or portions of doll clothing items), housings, wheels, tires, decorative cases, game pieces, playsets, etc.

Figure 3:
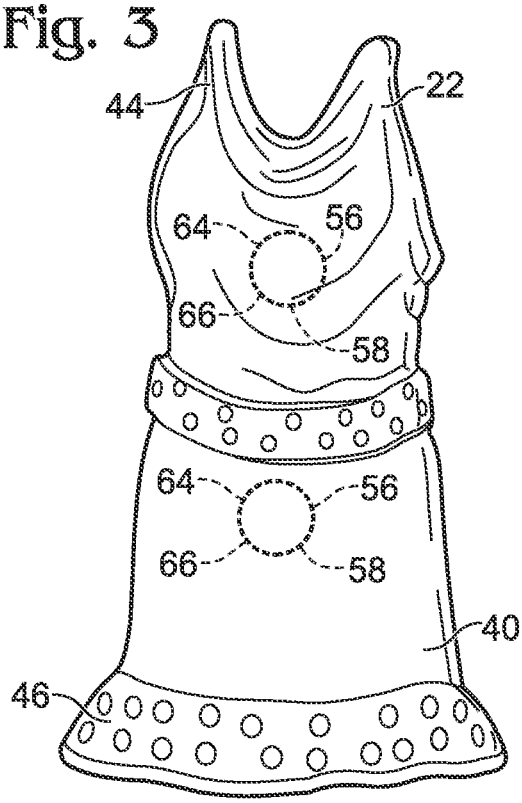
FIG. 3 is a top view of the first portion of the molded toy clothing item.
Figure 4:
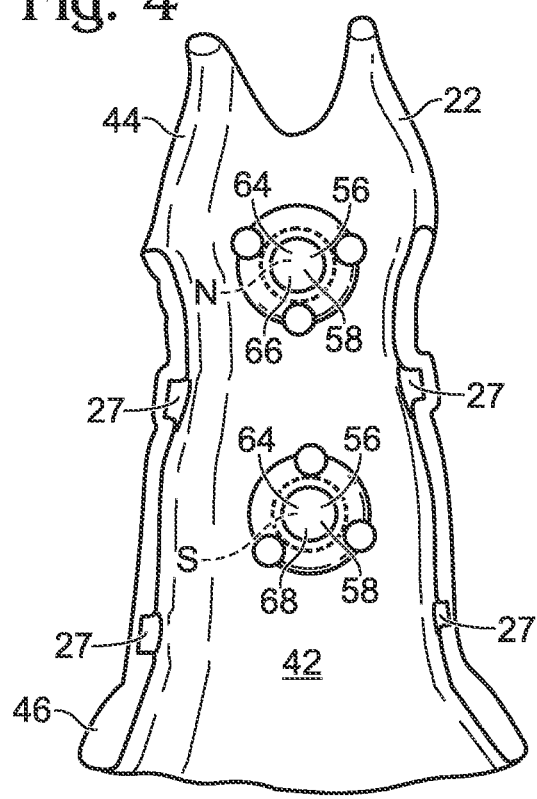
FIG. 4 is a bottom view of the first portion of the molded toy clothing item.

FIGS. 2-4 show examples of suitable molded articles produced by method 10 in the form of a toy clothing item 20 having first and second portions 22 and 24 for one or more toy dolls 26. The first and second portions may include a plurality of connectors 27 configured to connect the first and second portions to form the toy clothing item, such as protruding and recessed members, tabs and slots, etc.

Toy doll 26 may include a front portion 28, a back portion 30, and one or more doll magnetic-attraction elements 32 that are complementary with magnetic-attraction elements of toy clothing item 20 to provide magnetic attraction between doll magnetic-attraction elements 32 and the magnetic-attraction elements of the toy clothing item. "Magnetic-attraction elements," as used herein, refers to structures that include magnet(s), magnetic metal(s), metal(s), electromagnetic system(s), and/or other structure(s) configured to be magnetized, attracted, and/or repelled by one or more magnetic forces, and/or generate magnetic forces.

In some embodiments, doll magnetic-attraction elements 32 may include doll magnets 34, such as a first doll magnet 36 and a second doll magnet 38. The doll magnets may be positioned in any suitable area(s). For example, doll magnets 34 may be positioned in the toy doll such that the doll magnets are adjacent to magnetic-attraction elements of the toy clothing item when that item is on the toy doll.

Additionally, the doll magnets may have any suitable polarity. In some embodiments, the first and second doll magnets may have an opposite polarity, which may assist in proper positioning of the toy clothing item or ensuring that the toy clothing item (or portion of the toy clothing item) is placed on the proper portion of the toy doll. For example, first doll magnet 36 may have a polarity such that a South Pole S of the first doll magnet faces front portion 28 of the doll and second doll magnet 38 may have a polarity such that a North pole N of the bottom magnet faces front portion 28 of the doll.

Although doll magnetic-attraction elements 32 are shown to include doll magnets 34, the magnetic-attraction elements may alternatively, or additionally, include magnetic metal(s) and/or metal(s). Additionally, although the molded article produced by method 10 is shown to be toy doll 26, method 10 may produce any suitable molded toy, which may include one or more magnetic-attraction elements.

Regarding the first and second portions of clothing item 20, first portion 22 may be a front portion, and second portion 24 may be a back portion of the clothing item. Although first and second portions are shown to be front and back portions of the clothing item, they may be any suitable portions of the clothing item, such as left and right portions. Additionally, although toy clothing item 20 is shown to be formed from first and second portions 22 and 24, the clothing item may include less or more portions.

First portion 22 may include an outer surface 40, an inner surface 42, a top portion 44, and a bottom portion 46. Similarly, second portion 24 may include an outer surface 48, an inner surface 50, a top portion 52, and a bottom portion 54. Additionally, or alternatively, the first portion may include one or more first preformed items 56 that may be insert molded into the first portion via method 10. The first preformed items may include one or more first magnetic-attraction elements 58. Similarly, the second portion may include one or more second preformed items 60. The second preformed items may include one or more second magnetic-attraction elements 62.

The first and/or second magnetic-attraction elements may be positioned in any suitable area(s) of the first and second portions. For example, one or more of those elements may be located within inner surfaces 42 and 50 of the first and second portions and/or may be elevated off that surface, as shown in FIGS. 2-4. At least part of first and/or second magnetic-attraction elements may be exposed. Additionally, or alternatively, the first and/or second magnetic-attraction elements may be arranged in any suitable way, such as vertically.

Although first and second magnetic-attraction elements 58 and 62 are shown to be located within inner surfaces 42 and 50, those elements may be positioned within any suitable part(s) of the first and second portions. Additionally, although first and second magnetic-attraction elements are shown to be oriented vertically, they alternatively, or additionally, may be oriented horizontally, diagonally, and/or any suitable way(s). Moreover, although two first magnetic-attraction elements 58 and two second magnetic-attraction elements 62 are shown, the clothing item may include any suitable number of first and second magnetic-attraction elements.

First magnetic-attraction elements 58 may include one or more first magnets 64, such a top magnet 66 and a bottom magnet 68. Top and bottom magnets 64 and 66 may have any suitable polarity. In some embodiments, the top and bottom magnets may have an opposite polarity, which may assist in proper positioning of the toy clothing item or ensuring that the toy clothing item (or portion of the toy clothing item) is placed on the proper portion of the toy doll. For example, top magnet 66 may have a polarity such that a North Pole N of the top magnet faces the toy doll when the first portion is placed on the toy doll. Additionally, or alternatively, bottom magnet 68 may have a polarity such that a South Pole S of the bottom magnet faces the toy doll when the first portion is placed on the toy doll.

Second magnetic-attraction elements 62 may include one or more second magnets 70, such a top magnet 72 and a bottom magnet 74. Top and bottom magnets 72 and 74 may have any suitable polarity. In some embodiments, the top and bottom magnets may have an opposite polarity, which may assist in proper positioning of the toy clothing item or ensuring that the toy clothing item (or portion of the toy clothing item) is placed on the proper portion of the toy doll. For example, top magnet 72 may have a polarity such that a South Pole S of the top magnet faces the toy doll when the second portion is on the toy doll. Additionally, or alternatively, bottom magnet 74 may have a polarity such that a North Pole N of the bottom magnet faces the toy doll when the second portion is on the toy doll.

Although the portions of toy clothes are shown to each include two magnets, one or more of the portions of toy clothes may include more or fewer magnets. Additionally, although two portions (front and rear) of the toy clothes are shown, other suitable number and/or types (such as left and right) of portions may be produced by method 10. Moreover, although the molded articles are shown to be toy clothes for dolls, the molded articles may be any suitable articles.

As described above, method 10 may involve securing a preformed item to a desired location within a mold. An illustrative mold suitable for forming molded toy products, such as toy clothing items for toy dolls, is shown generally at 76 in FIGS. 5-7. The mold may include a mold core 78 and at least one mold cavity wall 80 forming a mold cavity 82. The mold cavity may be configured to receive moldable material and allow the moldable material to cure to produce a molded product 83 that incorporates one or more preformed items.

Mold core 78 may include at least one core surface 84 and at least one core magnetic-attraction element 86. The core magnetic-attraction element may be complementary with at least one magnetic-attraction element 88 of a preformed item 89, such as a portion of a toy clothing item for a toy doll, to provide magnetic attraction between the core magnetic-attraction element and the magnetic-attraction element of the preformed item.

The core magnetic-attraction element may include at least one core magnet 90. The core magnet may have any suitable polarity, such as the opposite polarity of the magnetic-attraction element of the preformed item. In some embodiments, core magnet 90 may be reversible such that the polarity of the core magnet may be changed for different applications. Although core magnetic-attraction element 86 is shown to include core magnet 90, the core magnetic-attraction element may alternatively, or additionally, include other type(s) of magnetic-attraction elements, such as magnetic metal(s), metal(s), electromagnetic system(s), etc. For example, core magnetic-attraction element 86 may include at least one electromagnet (not shown), which may be configured to allow a user to select magnetic properties of the electromagnet, such as its polarity.

Additionally, or alternatively, mold core 78 may include one or more guides 92, which may include any suitable structure configured to align a preformed item on a desired location on the mold core surface, such as on the core magnetic-attraction element. For example, guides 92 may include elongate pins 94. The guides may be located on any suitable portions of core surface 84. For example, guides 92 may be spaced apart and/or extend from the core surface.

In some embodiments, the spaced-apart guides may define a space 96 that is sized to receive at least a portion of a preformed item. In some embodiments, the core magnetic-attraction element may extend from core surface 84 and/or may be aligned with space 96 between guides 92. Although two guides 92 are shown, the mold core may include any suitable number of guides, such as three or four guides.

Mold core 78 and mold cavity wall 80 may include any suitable connectors 98 configured to releasably secure the mold cavity wall to the mold core. Although mold 76 is shown to include a single mold cavity wall 80, the mold may include two or more mold cavity walls, which may form one or more mold cavities with the mold core. The mold core may include other suitable features to produce the desired molded articles. For example, the mold core may include features designed to create one or more tabs, recesses, and/or other suitable connectors in the molded products. When the molded articles are portions of a clothing item, the tabs and/or recesses formed may be used to attach and/or interconnect the portions.

Although the mold core is shown and discussed to include magnetic-attraction elements, guides, and features to create connectors, the mold core may include any suitable features to produce the desired molded product. Additionally, although preformed items 89 are shown to be secured to mold core 78, the preformed items may additionally, or alternatively, be secured to a mold cavity wall, or any other suitable surface within or on a mold.

Securing preformed item 89 at 12 in method 10 may include positioning the preformed item such that the preformed item and/or magnetic-attraction element 88 are adjacent to or in contact with core magnetic-attraction element 86. Additionally, positioning the preformed item may include positioning at least a portion of the preformed item in space 96 between guides 92.

After the preformed items are secured to the mold, the molding process may begin. The process may include adding an exterior portion of a mold around a mold core, and then injecting a moldable material into the mold to fill a space between the mold core and the mold cavity wall with moldable material. The methods of securing the preformed materials disclosed above and/or in the patents incorporated by reference hold the preformed materials sufficiently strongly to allow the use of high-pressure injection processes without significantly shifting of the preformed items on the surface of the mold core. Thus, where an injection molding process is used, the moldable material may be injected at essentially any suitable location within the mold.

The mold may be filled with any suitable moldable material. Examples may include elastomeric materials, as well as more rigid materials, such as ABS plastic. After injecting the moldable material into the mold, the moldable material is cured or otherwise hardened to form an outer molded portion, typically by cooling the mold. Examples of suitable moldable materials for use in such an injection molding process may include SEBS kraton blends, SBS kraton blends, high-impact styrene, ABS, acrylics, polycarbonates, PVC, and commodity grade and engineering grade resins.

Once the molding process is complete, the molded article may be removed from the mold in any suitable manner. Upon completion of the molding process, the preformed items may be incorporated within the molded article. In some embodiments, because the mold does not use mounting holes for holding each of the preformed items, the molded article may have fewer exposed tooling holes or other imperfections than if it were formed via conventional insert molding techniques. This may significantly increase the efficiency, and decrease the costs, of the overall molding process, as it may allow clean-up steps downstream of the molding steps to be eliminated.

After removing the molded article from the mold, various other features may be added to the molded article to form the desired product, such as giving the molded article a more realistic appearance. For example paint may be added to the molded article. Alternatively, or additionally, one or more pigments, dyes, and/or other colorants may be added to the moldable material before adding the moldable material to the mold. The colorant may be added in a sufficient quantity to render the molded article opaque, or may be added in a lesser quantity if desired. Sufficient colorant may be used to render the molded article opaque to hide the preformed items from view.

As described above, method 10 may be used to mold many different types of preformed items into many different types of molded articles. While described above primarily in the context of injection molding, an insert molding process according to the present disclosure also may be employed in the context of other molding techniques. One example of another suitable technique is roto-casting. Roto-casting processes typically involve the use of a closed mold into which pellets of a selected polymer (for example, a vinyl polymer) are added, along with a plasticizer solution.

According to the present disclosure, a preformed item may simply be secured to an inner surface of a roto-casting mold with one or more securing magnets and/or one or more guide members. After adding the pellets to the mold, the mold may be closed, heated, and spun on at least one axis (or on two axes). The heat melts the polymer pellets, thus allowing the plasticizer to be incorporated into the polymer matrix. The above process also may cause the preformed item to be at least partially surrounded by, and bonded to, the polymer. After a suitable period of time, the heat may be removed from the mold, and the mold may be cooled, either by air-cooling or by immersion in water, thus fixing the preformed item in the molded article.

Examples of other suitable molding processes suitable for use in an insert-molding process according to the present disclosure include blow molding (stretch, extrusion, or injection), compression molding, transfer molding (typically used for thermosets, but also may be used in rubber molding), reaction injection (RIM) molding (typically used with urethanes, involves the mixing of two reactive materials in the mold, also may include foam molding), vacuum forming, cold casting, dip molding, and slush molding, which is similar to roto-casting but may yield thinner parts.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

What is claimed is:

1. A method of forming a molded toy product, comprising:
   securing a first magnet to a first surface of a mold via first magnetic attraction between the first magnet and the first surface;
   securing a second magnet to a second surface of the mold via second magnetic attraction between the second magnet and the second surface, the second surface being spaced from the first surface;
   adding moldable material into the mold such that the moldable material covers a first portion of the first magnet and a second portion of the second magnet, but leaves a third portion of the first magnet and a fourth portion of the second magnet uncovered, the third portion being of opposite polarity from the fourth portion; and
   curing the moldable material.

2. The method of claim 1, where the mold includes a first magnetic-attraction element extending from the first surface and complementary with the first magnet to provide the magnetic attraction between the first magnet and the first surface, and a second magnetic-attraction element extending from the second surface and complementary with the second magnet to provide the magnetic attraction between the second magnet and the second surface, wherein securing the first magnet includes positioning the first magnet such that the third portion of the first magnet is in contact with the first magnetic-attraction element, and securing the second magnet includes positioning the second magnet such that the fourth portion of the second magnet is in contact with the second magnetic-attraction element.

3. The method of claim 2, where the first magnetic-attraction element includes a third magnet, and the second-magnetic attraction element includes a fourth magnet.

4. The method of claim 2, where the mold includes spaced-apart first elongate pins that extend from the first surface, and spaced-apart second elongate pins that extend from the second surface, the first magnetic-attraction element being aligned with a first space between the first elongate pins, and the second magnetic-attraction element being aligned with a second space between the second elongate pins, wherein positioning the first magnet includes positioning the third portion of the first magnet in the first space between the first elongate pins, and positioning the second magnet includes positioning the fourth portion of the second magnet in the second space between the second elongate pins.

5. The method of claim 1, wherein adding the moldable material into the mold includes reaction injection molding with at least two reactive components.

6. The method of claim 1, wherein the moldable material includes at least one of ABS plastic and elastomers.

7. The method of claim 1, wherein the molded product is molded via a roto-casting molding process.

8. The method of claim 1, wherein the molded product is molded via a slush molding process.

9. The method of claim 1, further comprising removing the molded product from the mold after curing the moldable material.

10. The method of claim 1, wherein the molded product is a shell for covering a toy doll.

11. A method of forming a molded toy product, comprising:
    securing a first magnet to a first surface of a mold via first magnetic attraction between the first magnet and the first surface, the mold including a second magnet extending from the first surface and complementary with the first magnet to provide the first magnetic attraction between the first magnet and the first surface, where the mold further includes spaced-apart first elongate pins that extend from the first surface and the second magnet is aligned with a first space between the first elongate pins, wherein securing the first magnet includes positioning a first portion of the first magnet in the first space between the first elongate pins such that the first portion is in contact with the second magnet;
    securing a third magnet to a second surface spaced from the first surface via second magnetic attraction between the third magnet and the second surface, the mold including a fourth magnet extending from the second surface and complementary with the third magnet to provide the second magnetic attraction between the third magnet and the second surface, where the mold further includes spaced-apart second elongate pins that extend from the second surface and the fourth magnet is aligned with a second space between the second elongate pins, wherein securing the third magnet includes positioning a second portion of the third magnet in the second space between the second elongate pins such that the second portion is in contact with the fourth magnet, the second portion of the third magnet being of opposite polarity from the first portion of the first magnet;
    adding the moldable material into the mold such that the moldable material covers a third portion of the first magnet and a fourth portion of the third magnet, but leaves the first portion of the first magnet and the second portion of the third magnet uncovered; and
    curing the moldable material.

* * * * *